Patented Jan. 29, 1952

2,583,605

UNITED STATES PATENT OFFICE 2,583,605

SILICA BASE LUBRICATING GREASE

Aurelio F. Sirianni and Ira E. Puddington, Ottawa, Ontario, Canada, assignors to The Honorary Advisory Council for Scientific and Industrial Research, Ottawa, Ontario, Canada, a body corporate of Canada No Drawing. Application December 18, 1948, Serial No. 66,132

4 Claims. (Cl. 252—21)

The present invention relates to silica base lubricating grease and is particularly concerned with the waterproofing of such greases. Silica base greases are prepared by replacing the normal liquid content of a voluminous silica compound, such as silica gel, which may be accompanied by other grease thickening agents, by a lubricating oil, preferably but not necessarily a mineral base lubricating oil. Compositions of this character are likely to be adversely affected by contact with water, or even by contact with moist air for prolonged periods of time, because normal silica gels have a greater affinity for water than for oil. As a result of such affinity, liquid water or water vapor will preferentially wet the silica and displace the oil, causing the grease to "bleed" and lose its normal solid structure.

It is therefore an object of this invention to prevent the preferential wetting of the silica compound in a silica base lubricating grease by waterproofing or rendering water repellent the inorganic gel. When this is accomplished, the liquid oil content is no longer readily displaced by water and the structural or mechanical stability of the grease is materially improved.

The particular method by which the silica base grease is produced is not a part of the present invention. Methods for producing silica gel greases are known in the prior art, and a specific preferred method, which includes waterproofing broadly, is described and claimed in a copending application for patent, Serial No. 66,130, filed December 18, 1948, by the present inventors. In general, however, the silica gel is manipulated in such a manner that its normal water content is removed without collapsing the gel structure. This may be accomplished in various ways, as described in said copending application, a preferred method involving the use of a mutual solvent, such as acetone, for example, which first displaces the normal water content and may later be displaced in turn by the oil. Alternatively, silica aerogels of uncollapsed gel structure may be treated with lubricating oil to set up the desired grease structure by direct incorporation of oil.

The desired grease product in its finished state has a colloidal and generally homogeneous structure very similar to that of ordinary commercial soap-thickened greases. It has, moreover, certain desirable properties which cannot be found in soap base greases, such as a structural stability at extremely high temperatures when soaps would melt and hence soap greases would lose their body and become relatively fluid.

According to the present invention, it has been found that inorganic gel greases, specifically silica gel greases (although the invention is applicable to other generally similar materials of inorganic voluminous precipitate character and may also include organic thickeners) may be waterproofed by the use of certain alkyd resin compositions so that once a grease structure is established it will remain stable in the presence of liquid moisture or moist vapor. Specifically, the modified alkyd resins are used in proportions of about 10 to 100%, based on the weight of the dry silica compound, or about 1 to about 20%, more or less, based upon the total weight of the finished grease composition. The oil, which is preferably a mineral base oil of lubricating grade, but may be a synthetic ester or glycol type oil, or a mixture of such with mineral oil, constitutes about 60 to 98% of the weight of the composition, the gel about 1 to 20%, and the waterproofing material about 1 to 20% by weight. Preferred ranges are about 80 to 95% oil by weight, 4 to 14% gel constituent, on a dry weight basis, and 1 to 6% waterproofing agent.

The resins contemplated for the purposes just described are preferably those obtained by esterifying poly acids or acidogenic materials, such as phthalic, maleic or succinic acids or their anhydrides, for example tetrachlorophthalic anhydride, with polyhydroxy alcohol. Such esterifications normally result in products which are resinous in nature and of high molecular weight. Specifically, the preferred resin is the modified alkyd resin obtined by reacting glycerol and phthalic anhydride in the presence of fatty oils, such as the so-called drying oils, i. e., oils which polymerize or cause polymerization. By such modification, apparently, the fatty acids of such oils are introduced into the resin molecule to impart polymerizing properties thereto. Such a resin is particularly useful for rendering the greases moisture and water resistant and repellent. Excess resin should not be used because the yield value or grease thickening effect of the resulting product is reduced excessively. The production of modified resins of this type is a well known commercial process and need not be described in further detail. The invention will be better understood upon consideration of specific examples:

*Example 1*

A modified alkyd resin prepared from phthalic anhydride and glycerol in the presence of stearic, oleic, linoleic acids, or specifically linseed oil, was dissolved in chloroform. The preparation of modified alkyd resins of this type is well understood in the art. In general, phthalic anhydride and glycerol are combined in proportions of about 3 mols of anhydride with about 2 mols of glycerol, sufficient linseed oil being added to give drying properties to the resin. These resins per se form no part of the present invention. They are described, for example, in "Organic Chemistry" by Fieser and Fieser, Heath & Co., 1944, pages 912 to 914, and are commonly known as modified glyptal resins. The quantity of resin was 10% by weight, based on the dry silica aerogel. Mineral oil of lubricating grade, having a viscosity of about 300 S. S. U. at 100° F., was added, about 90 parts by weight of oil to 9 parts of dry gel, by weight being used in this example. The solvent was next flashed off and the resulting dispersion of resin, aerogel and oil was passed through a colloid mill to obtain complete dispersion of resin and gel. The resulting grease was water repellent. It had about the same hardness or consistency as non-waterproofed grease of the same silica gel content, i. e., it had about the same yield value and resistance to flow.

The treatment just described may also be applied to silica gel greases which are prepared by solvent exchange methods referred to above and described more fully in said copending application. The waterproofing resin may be added to the oil or even after the oil has been incorporated in the gel. In the latter case, however, the grease should be subjected to drastic shearing treatment, as by passing it through a colloid mill, in order to disperse the waterproofing resin completely in the gel. Preferably the silica is waterproofed prior to or simultaneously with the incorporation of the oil.

*Example 2*

A grease having a composition of 15% by dry weight of silica aerogel, 3% modified alkyd resin, prepared as above, and 82% lubricating oil of about 300 S. S. U. viscosity at 100° F. was prepared without water, and with varying small amounts of water and tested for worked penetration after 0 hours, and after heating to 105° C. for 24 hours and 576 hours respectively. The data are shown in the following table:

| Grease | 0 hours | Worked penetration after heating at 105° C. ± 1° C. | |
|---|---|---|---|
| | | 24 hours | 576 hours |
| Original | 335 | | |
| 0.25% water | 275 | 248 | 255 |
| 1.0% water | 265 | 195 | 204 |
| 2.0% water | 225 | 181 | 195 |

The grease of this example had excellent water resistance both before and after the addition of water. By comparison a standard commercial cup grease containing 12% by weight of lime soap separated completely after standing overnight at the test temperature of about 105° C.

While the modified alkyd resins referred to above appear to be particularly suitable for waterproofing silica base greases, they are useful also in connection with greases based on other inorganic gels. Thus greases made by incorporating oil into aluminum hydroxide or ferric hydroxide may be given increased resistance to water by this treatment. In fact any of the voluminous precipitates which have been found suitable for thickening oils into greases, such as bentonite and analogous colloidal earths, may be waterproofed at least to some degree in the manner set forth above.

The alkyd resins derived from glycerol and phthalic anhydride, and modified with fatty acids which are fairly unsaturated, e. g., drying oils, etc. are preferred as waterproofing agents because of their high molecular weight and their excellent drying properties, but it will be understood that the invention is not necessarily limited thereto. The unmodified resins, and the resinous ester polymers of other polybasic acids and polyhydric alcohols may also be used provided they have the requisite affinity for the silica or other thickener to be waterproofed and provided, of course, that they are satisfactorily water repellent of themselves.

The invention also contemplates the waterproofing of mixed greases, such as those having combinations of silica with other thickening agents, e. g., soaps, metal sulfonates, other voluminous precipitates such as finely divided mica, aluminum hydroxide bentonite, ferric hydroxide and the like. Organic thickeners, such as cellulose or precipitated viscose also may be used.

It will be understood that the composition consists primarily of lubricating oil, especially mineral base oil, thickened and waterproofed as described above, the oil being with or without conventional additives such as viscosity index improvers, tackiness agents, antioxidants, corrosion inhibitors, extreme pressure agents, and the like.

What is claimed is:

1. A lubricating grease composition consisting essentially of mineral base lubricating oil thickened to a grease consistency with 1 to 20% by weight, based on the total composition, of a silica gel, said gel being waterproofed with 10 to 100% by weight, based on the dry silica content, of a linseed oil modified alkyd resin.

2. A lubricating grease composition consisting essentially of 60 to 98% mineral base lubricating oil by weight, 1 to 20% silica gel, and 1 to 20% by weight of a linseed oil modified phthalic acid-glycerol resin.

3. A lubricating grease composition consisting essentially of about 90 parts by weight of mineral base lubricating oil, 9 parts by weight of silica gel on a dry basis, and 1 part of linseed oil modified glyptal resin.

4. Composition as in claim 2 wherein a soap type thickener is added.

AURELIO F. SIRIANNI.
IRA E. PUDDINGTON.

REFERENCES CITED

The following references are of record in the file of this patent:

UNITED STATES PATENTS

| Number | Name | Date |
|---|---|---|
| 2,260,625 | Kistler | Oct. 28, 1941 |